United States Patent

Kaiser

[15] 3,701,943

[45] Oct. 31, 1972

[54] PROCESS AND DOUBLE-BRIDGE ARRANGEMENT FOR EXAMINATION OF RAPID PHASE AND AMPLITUDE CHANGES OF HIGH-FREQUENCY WAVES CAUSED BY A MEDIUM UNDER TEST

[72] Inventor: Nils Kaiser, 80 Waldpromenade, Gauting, near Munich, Germany

[22] Filed: Sept. 7, 1967

[21] Appl. No.: 666,058

Related U.S. Application Data

[63] Continuation-in-part of Ser. No. 290,139, June 24, 1963, abandoned.

[52] U.S. Cl. .................................................. 324/58.5 R
[51] Int. Cl. .................................................. G01r 27/04
[58] Field of Search .......................... 324/58, 58.5, 84

[56] References Cited

UNITED STATES PATENTS

| | | |
|---|---|---|
| 2,983,866 | 5/1961 | Alford et al. ................. 324/58 |
| 2,436,828 | 3/1948 | Ring ..................... 324/58 A X |
| 2,659,860 | 11/1953 | Breazeale .............. 324/58.5 A |
| 2,798,197 | 7/1957 | Thurston .............. 324/58.5 A |
| 2,867,781 | 1/1959 | Tomiyasu ............. 324/58.5 A |
| 2,939,076 | 5/1960 | Dropkin ................... 324/58 A |

OTHER PUBLICATIONS

Cohn et al., Article in IRE International Convention Record, Vol. 9, Part 3, pgs. 147– 150 (1961).

*Primary Examiner*—Michael J. Lynch
*Attorney*—Francis M. Crawford

[57] ABSTRACT

The present invention relates to a method of examining the condition of a medium undergoing chemical or physical changes, as for example, the measurement of reaction speeds, wherein the medium undergoing physical and/or chemical change is subjected to ultrahigh frequency radiation beams and detecting and measuring any changes in phase of the said frequency after contact with the medium. One convenient method of carrying out the claimed invention comprises directing an ultrahigh frequency wave beam at a specified frequency upon the medium to be measured and detecting and measuring any changes of amplitude and phase of the frequency of the beam after leaving said medium.

4 Claims, 6 Drawing Figures

PROCESS AND DOUBLE-BRIDGE ARRANGEMENT FOR EXAMINATION OF RAPID PHASE AND AMPLITUDE CHANGES OF HIGH-FREQUENCY WAVES CAUSED BY A MEDIUM UNDER TEST This application is a continuation-in-part of my co-pending application Ser. No. 290,139 filed June 24, 1963, and now abandoned.

The invention relates to a process for examining the possibly varying chemical and physical condition of a medium by directing high frequency waves upon the medium.

It is known to measure the phase shift, the energy change, or the change in some other electrical characteristics of waves that is caused by the medium, the measurements to be made, for example, by comparing the wave characteristics at the transmitter and at the receiver.

According to the known methods of examining the condition of a body by means of radiation, two beams are emitted from the transmitter while the body to be examined is placed in the path of one of those beams, the energy change in that beam traversing the body is then compared at the receiver with the other beam. Similarly it is also possible by a known method to measure the phase shift during passage of waves through the body by sending one beam directly from the transmitter to the receiver while another beam which would normally be in phase with the first beam, is first sent through the body and then to the receiver. All of these known methods have the disadvantage in that they can be carried out with only one frequency at a time, there being relatively long time intervals if the measurements are made with several frequencies. Another difficulty is that the body to be measured must be of a certain minimum size relative to the wave lengths employed. There may also be uncontrollabel losses due to scattering of radiation by the surface of the body, or the measurements may be disturbed by dimensional changes of the body, and there may also be difficulties in separating the two wave trains from each other.

It is thus an object of the present invention to provide a method that will not be subject to these difficulties but which will give accurate and dependable measurements for the continuous recording of chemical or physical processes.

According to one aspect of the present invention in a preferred embodiment thereof it is suggested to subject a medium undergoing physical and/or chemical changes with ultrahigh frequency radiation beams preferably in the microwave region and of a highly monochromatic nature but at different frequencies which pertain to absorption lines or other characteristical bands of the medium in its original and its modified state, including eventually intermediate state or states; the different frequencies are either applied simultaneously or continuously alternatingly and intermittently. The several characteristic frequencies pertain to a common band. The interaction of medium and microwave beams by, for example, molecular resonance, dielectric dispersion etc., is individually detected and continuously registered. Such interaction usually will result in attenuation and/or phase shift.

While the specification concludes with claims particularly pointing out and distinctly claiming the subject matter which is regarded as the invention, it is believed that the invention, the objects, and features of the invention and further objects, features and advantages thereof will be better understood from the following description taken in connection with the accompanying drawing in which:

In practicing the invention, use is preferably made of an electrical network having as one circuit component a hollow conductor containing the material. Such an apparatus is especially advantageous where electromagnetic disturbances from the outside are to be avoided, or where during precision measurements of absolute values, uncontrollable scattering effects on the surface of the medium or disturbances caused by geometric changes of the medium are to be avoided.

The material can be irradiated in one or in several places simultaneously or successively at Brewster's angle. This method is adavantageous where the problem is to apply the waves effectively to the medium while they tend to spread out freely in space.

Figure 1:
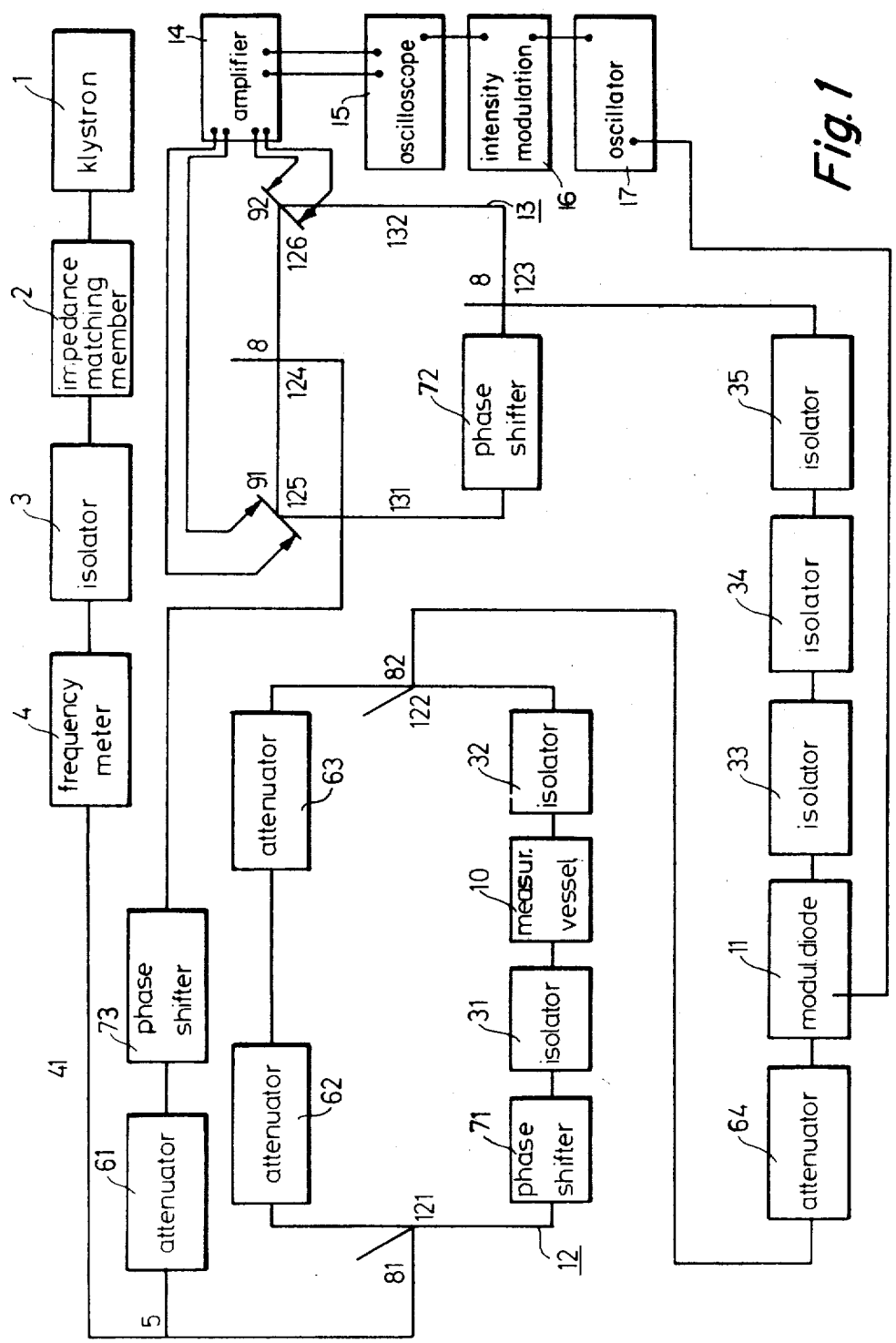
FIG. 1 illustrates schematically an apparatus constituting an example of one component or system to practice the method of the present invention.
Figure 2:
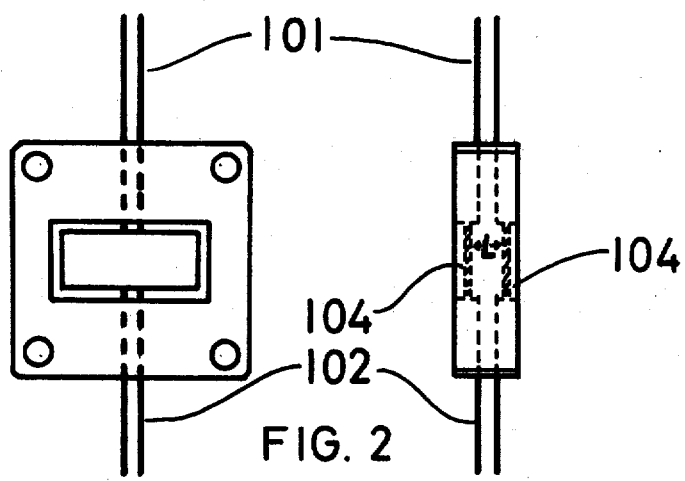
FIG. 2 illustrates front and side elevation of a measuring vessel which can be employed in the system shown in FIG. 1.

For better understanding the inventive process and method and its exploitation, an apparatus to be used as one component for practicing the novel method is to be explained and described briefly with particular reference to FIGS. 1 and 2.

In FIG. 1 there is first shown a Klystron 1, constituting a prime microwave source, producing very high frequency radiation in the X band of about 10 kMc (3 cm wave length) and at a power output of 100 milliwatts. Isolator 3 which here actually is a one way microwave conductor is coupled to klystron 1 by means of a coupling and impedance matching member 2.

The output of isolator 3 passes a frequency meter 4 leaving same by a microwave transmission line such as a wave guide 41. There is next provided a directional coupling 5 branching off from wave guide 41 about 10 % of the transmitted microwave energy for feeding such portion to an attenuator 61. The course of this branched off portion will be explained more fully below.

The remaining microwave energy is passed onto a magic Tee member 121 with matched load 81. This magic Tee 121 is the input element for a measuring bridge 12.

There are two adjustable and calibrated attenuators 62 and 63 leading to a second magic Tee member 122 with matched load 82 thus defining the first branch of the measuring bridge 12, which can also be called reference branch.

The second branch of measuring bridge 12 is first comprised of a calibrated and adjustable phase shifter 71 coupled to the yet unconnected end of magic Tee 121, which phase shifter 71 in turn is coupled to an isolator 31. Next in line of this bridge branch (measuring branch) is a measuring vessel 10 of the type shown in detail in FIG. 2; there is then provided another rectifier 32 connected to the magic Tee member 122 thus completing the bridge.

The measuring vessel 10 may be provided with means for heating and/or cooling to maintain a desired temperature level. Rectifiers 31 and 32 are provided respectively ahead and behind vessel 10 to avoid bridge unbalancing due to reflection.

Upon preliminary operation, the bridge 12 is first balanced with the vessel 10 being empty. Balancing is carried out by adjusting attenuators 62 and 63 as well as phase shifter 71 if necessary. Then the measuring vessel 10 is filled with the medium serving as specimen, and again balance is restored by appropriate adjustment of elements 62, 63, and 71 as required. Balancing means that the flow of energy through the two bridge branches is equalized and at phase opposition so that the output at magic Tee 122 is zero.

Whenever bridge 12 is unbalanced, an error signal appears at the input side of attenuator 64 which is connected to magic Tee 122, and the attenuator 64 feeds a modulator diode 11. The error signal, of course, has also a frequency of 10 kMc, and modulation of the error signal is produced with a modulator frequency of 100 kcps – 0.0001 kMc derived from an oscillator 17 of appropriate and conventional design. There is amplitude modulation produced in diode 11 with the error signal constituting the carrier.

The output of diode 11 is passed through three successively connected isolators 33, 34 and 35 from which the amplitude-modulated and isolated error signal is passed on to a detector network 13 having as its first input element a magic Tee 123. This magic Tee 123 splits the input error signal into two similar portions. One portion is passed onto a phase shifter 72 producing a constant phase shift of 90° measured in relation to the carrier frequency. The other portion is not phase shifted.

The detector network 13 further includes a second magic Tee 124 to which is coupled the wave energy branched off the wave guide 41 at coupling element 5 and as fed through the attenuator 61 to a phase shifter 73 which in turn feeds magic Tee 124 as stated. At the latter magic Tee, the reference signal is likewise split into two similar portions. The phase shifted error signal is now passed through a twisted wave guide 131 to a magic Tee member 125 so as to be compared with a first reference signal component also applied to magic Tee 125. Magic Tee 125 has detectors 91.

The phase shifted error signal component is passed through a twisted wave guide 132 to a magic Tee member 126 so as to be compared with the other reference signal portion. There is a detector 92 at magic Tee 126.

The small unbalanced error signal has thus been divided into two orthogonal components which respectively represent phase error and attenuation error in the measuring vessel 10; which one of the signal components represents phase error or attenuation error depends, of course, on the phase shift produced in shifter 73.

An appropriate amplifier 14 provided with two amplification channels is connected to the two detectors 91 and 92 which amplifier is in turn connected, for example, to an oscilloscope 15 displaying the attenuation and phase shift. There is an impulse generator 6 with variable time delay, connected to the intensity modulation of the oscilloscope.

Element 15 is a simple oscilloscope, for example, a cathode ray oscilloscope for showing the output signals of the detectors, which are amplified by the amplifier 14. Element 16 is an intensity modulator the object of which is to trigger the oscilloscope, so that only some points of an ellipse, which normally would be displayed on the oscilloscope, are shown, namely the intersecting points of the ellipse with the longest axes of it. Element 17 is an oscillator (preferably a 100 kc oscillator) which modulates the error signal and, thus, enables amplification of the same. Oscillator 17 further triggers intensity modulator 16. Wave guides 131 and 132 are twisted each by 90° around their respective axis.

A detector as described has been operated successively at a sensitivity of − 95 dbm. The fastest changes detectable in vessel 10 are in the order of magnitude of milliseconds.

It will be appreciated that the electron circuit network does not have to be changed in principle, if the radiation in the measuring branch of bridge 12 does not penetrate the medium under examination, but if the physical location of vessel 10 is selected so that the reflection at the medium therein is detected and then fed to magic Tee member 122.

Proceeding now to FIG. 2 there is shown a measuring vessel 10 having inlet and outlet pipes 101 and 102, respectively. There being a window 104 in each side wall to separate the wave guide network from the fluid conduit system. L is the length of the travel path of the microwaves through vessel 10. Solid measuring objects can directly be inserted into the wave guide system.

The practicality of the invention can be derived from the curves plotted as example and shown in FIGS. 3 to 6.

Figure 3:
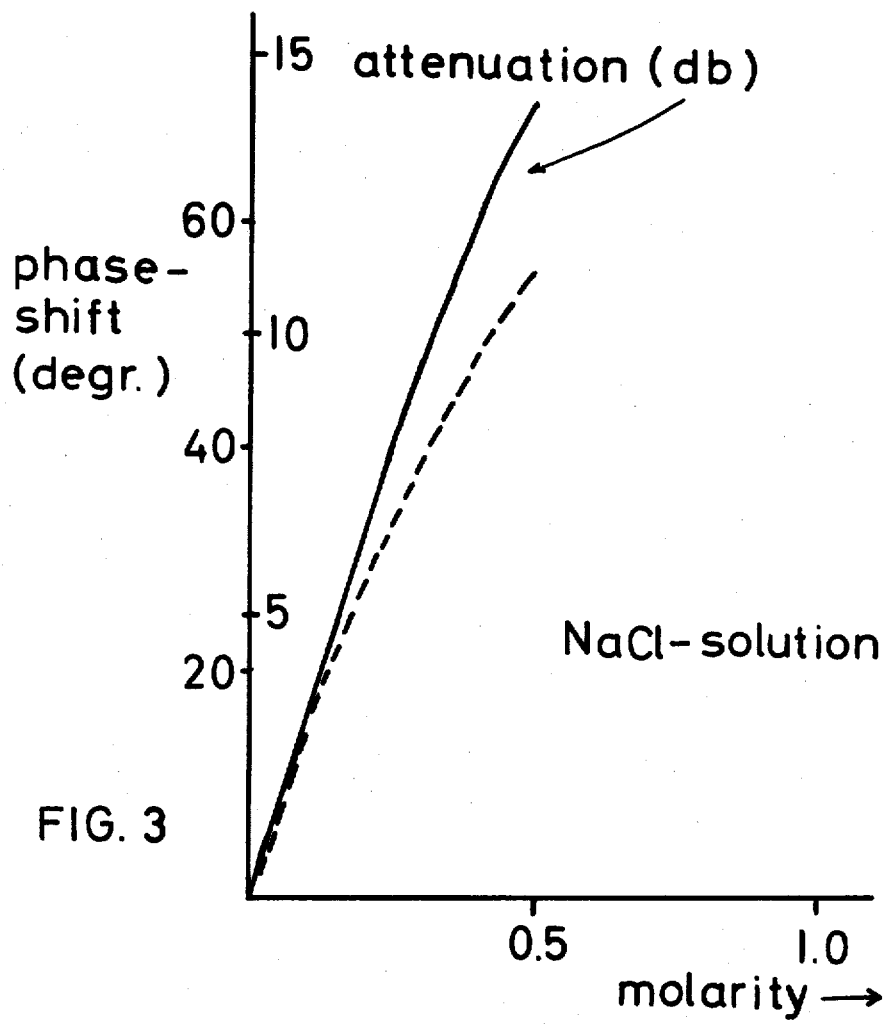
FIGS. 3 to 6 illustrates diagrams of the attenuation and/or phase shift plotted against the relative content of various compounds in water.

FIG. 3 shows attenuation (solid curve) and phase shift (dashed curve) of NaCl solved in water plotted against molar fractions or molarity with the scale being drawn so that attenuation and phase shift is zero for pure water.

Looking at the apparatus of FIG. 1, this curve can readily be obtained in first filling vessel 10 with water and balancing bridge 12 to zero output error signal. With increasing NaCl content, the corresponding bridge unbalance yields the plotted curves. Accordingly, the output can be used to determine the presence of NaCl in quantitative analysis. The frequency was 9,6 kMc.

Figure 4:
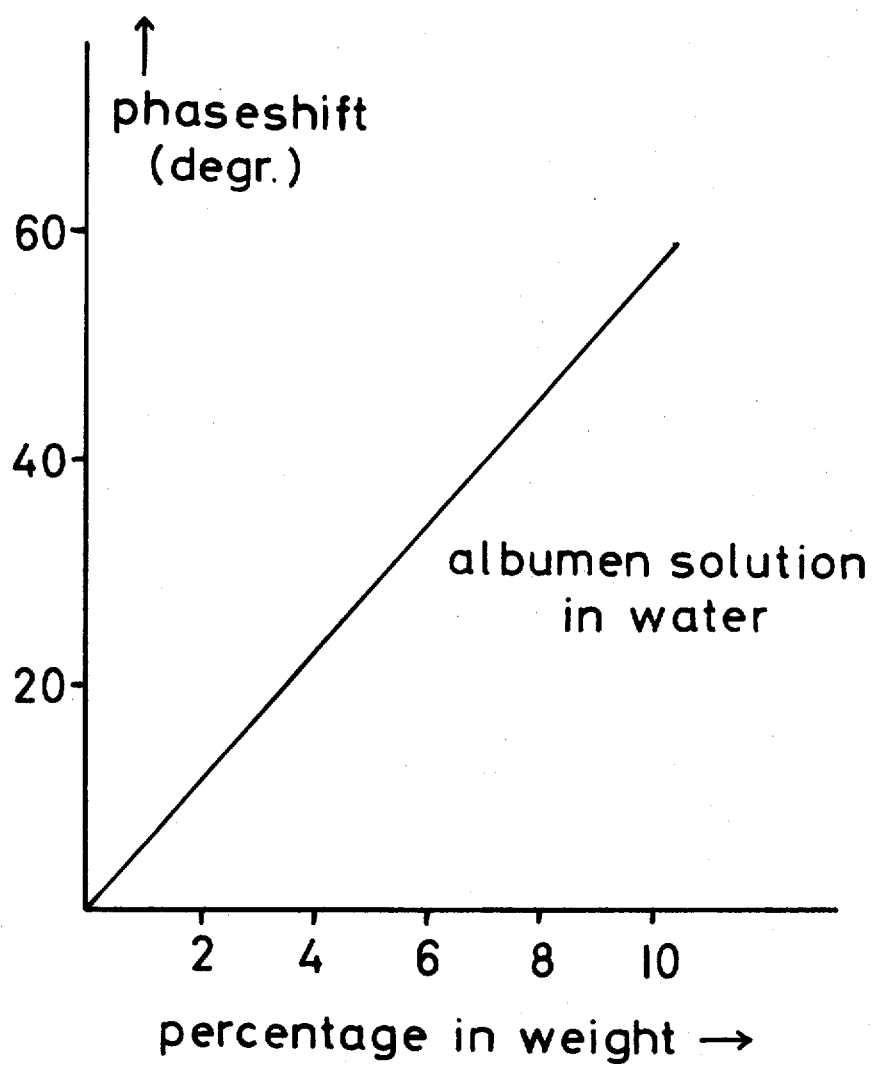

FIG. 4 illustrates the resulting phase shift for albumen solved in water with zero phase shift for pure water, plotted against perspectively solved percentages in weight.

Figure 5:
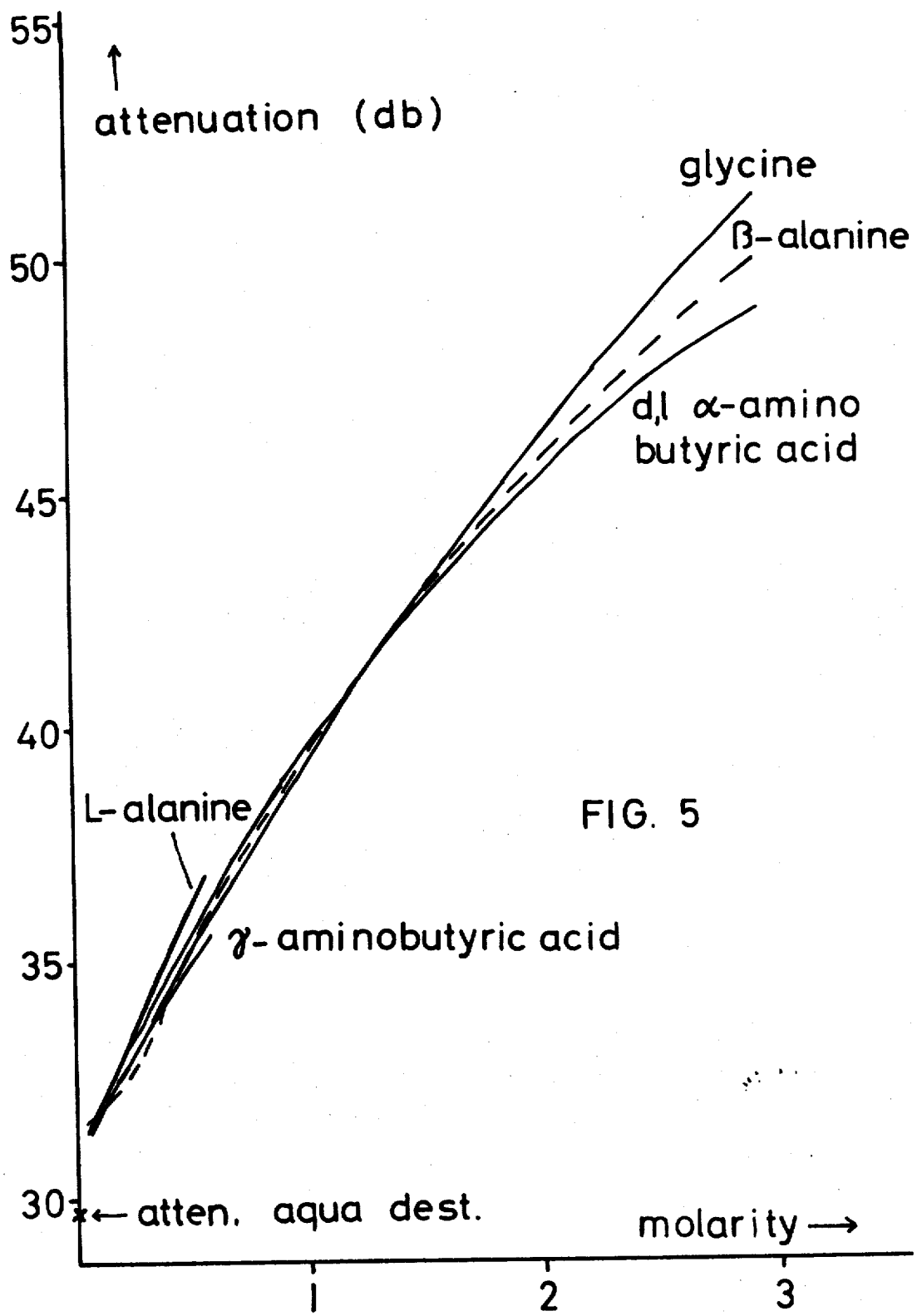

FIG. 5 illustrates attenuation for solutions in water of various organic compounds, plotted against molarity with the attenuation of water being between 29 and 30 db, a length L for the measuring vessel 10 of 10 mm which vessel was kept at a temperature of 37.0° centigrade during measuring.

Figure 6:
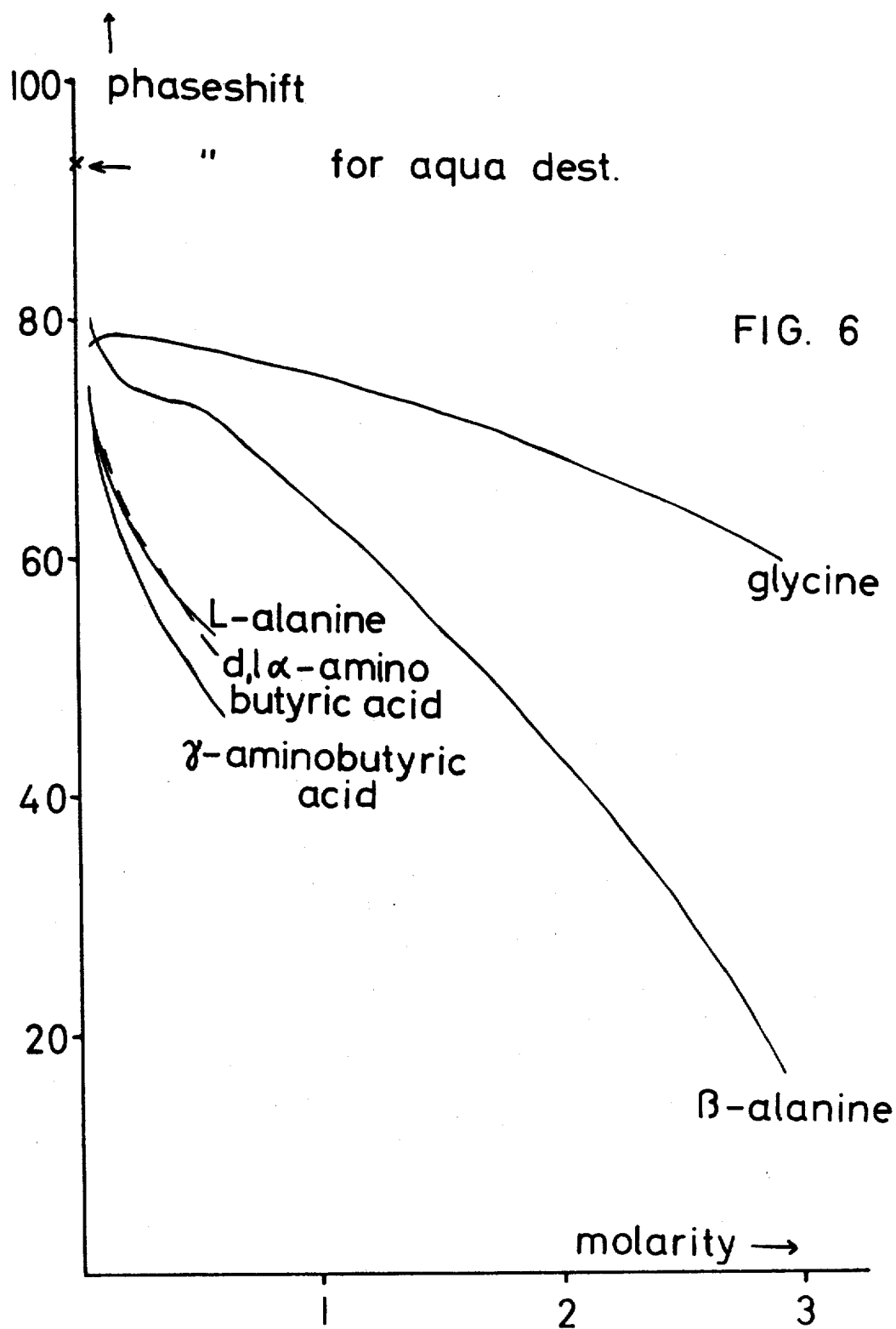

FIG. 6 illustrates phase shift for the same materials and under similar conditions.

From all these curves, it can be seen readily, that indeed any change in the relative content of any such substance is detectable as a phase shift in the transmitted microwave radiation as well as of the attenuation thereof.

For practicing the invention, there now will be provided, for example, two or more systems as shown in FIG. 1. It may be assumed that a chemical reaction be followed up and measured with such systems.

System I is now first attuned to a characteristic frequency of 3.0 kMc of the raw product (for example albumen solution in water) i.e., such raw product is filled into a measuring vessel of the type shown and the bridge 12 of system I is balanced, the error signal being correspondingly zero.

System II is positioned so that during the reaction it operates upon the same measuring vessel 10 (this can be made large enough and be provided with two sets of windows). System II is now attuned to a frequency of 70.0 kMc characteristic to the end product aminoacids, an available specimen thereof being used as a preliminary measure and to be filled into vessel 10 or a similar shaped calibrative vessel, then measuring bridge 12 of system II is balanced.

Next, the common measuring vessel or the communicating pipeline for the measuring vessels of system I and system II are connected to the chemical reaction chamber or to the pipe system being part of a chemical reaction system, and now raw material is effecting both systems I and II. Accordingly, system I will again produce error signal zero, but system II will produce maximum error signal because no end product is yet present in the measuring vessel or vessels.

After the reaction has been started, system I will produce an increasing error signal corresponding to the decrease in raw material, whereas the initially maximum error signal of system II will decrease with the increasing appearance of the end product.

The reaction is complete when system I is producing maximum error signal whereas system II has returned to perfect balance of its measuring bridge, then having zero error signal. In other words, completion of reaction can be detected by observing these error signals.

It is susceptible that thus far the most simple manner of practicing the invention has been described. In case of plural raw products (which is the normal case) there will be preferably one system of the type described with each such system producing zero error signal for the initial content of its associated raw material. In case there will be plural end products, again there will be provided an individual system for each of such end products. In case there are catalyst reactions or intermediate products to be supervised, again a system for each such product can be provided. Since each system produces two outputs: attenuation and phase shift, a double check is inherent.

In the present method it will be possible to make a continuous record of a chemical reaction or a change in a physical state or property. An important advantage of this process is that it permits continuous measurement not only of the quantitative yield of the final product, but also of transitory or intermediate products such as catalysts as stated. Ordinarily such transitory products escape detection. A further technical advantage is that by such continuous registration of the progress of a reaction, it will be easier to control the reaction itself. By continuously and simultaneously recording two different factors, such as attenuation and phase shift which undergo some change during almost every reaction, the results will be a definite improvement over what is possible with only a single measurement of one frequency.

The method here suggested can be practiced with a modified measuring bridge in one bridge branch thereof as well as in the measuring branch there are identical measuring containers made of the same substance, and where the container in the measuring branch holds the medium under examination. In other words, in lieu of attenuators 62 and 63, a similar assembly 71-31-10-32 is used in either bridge branch. The substances in either container may include, for example, a solvent in which the material under examination can be dissolved so as to compensate for disturbances caused by the presence of the solvent. Furtermore, since the two containers are of identical construction and are in circuit branches of the same length, it will be possible to carry out the measuring process with a wobbling frequency or with different frequencies.

According to one embodiment of the inventive method, a frequency band is chosen within which the change of dielectric constant of the medium can be determined by registering the phase shift. This procedure is especially advantageous if the change of dielectric constant is large relative to the attenuation and where for practical reasons, such as overheating, the region of high attenuation has to be avoided.

It is also possible to use a frequency band that lies within the high attenuation range of the medium as for instance in the range of anomalous dielectric dispersion or internal molecular resonance, where the change of wave energy due to absorption by the medium can be measured by the attenuation. The procedure here suggested is to be recommended especially when the attenuation is large in comparison with the dielectric constant.

According to an exceptionally advantageous procedure, the microwaves can be imposed upon the measuring medium by pulses whereby the duration of each pulse and the intervals between two succeeding pulses are measured in such a manner that the measurement itself will not produce any change in the medium, such as a rise in temperature, which could damage the material or affect the measured or registered values. This procedure is especially advantageous in that it permits the penetration of relatively thick layers of materials which have high attenuation and are thus more easily be heated. By this procedure it will therefore be possible to use this method on temperature-sensitive materials such as protein solutions which have high attenuation in certain frequency regions.

The method of this invention is applicable wherever the problem is to accurately record and control rapid chemical reactions and quick physical changes. The invention therefore has many uses, among which are the following.

1. Chemical analysis and the measurement of reaction speeds in research work.

2. The transfer of controlled chemical reactions from the experimental stage to the manufacturing stage.

3. The recording and control of the curing processes of polymerization reactions, as for example to increase the yield in artificial silk production.

4. In the manufacture of insulating materials, maximum insulation can be obtained from the available materials.

5. The automatic recording of aging processes continuously over prolonged periods of time by means of a graph-drawer.

6. Just as under 5, hygroscopic properties and moisture contents can be measured.

7. Recording the substance conversion in bacterial cultures and tissue extracts.

8. Continuously recording the digestion of proteins by ferments, and the denaturing of proteins by heat.

9. For medical purposes a measuring container can be connected into the blood circulatory system in animals or humans. It is also possible to send the radiation through other tissues like the ear lobule or the tongue, whereby it is possible to record the substance conversion under the most favorable physiological conditions, so as to permit an early diagnosis of metabolic disorder and a recording of chemical therapeutic action.

In either case, characteristic frequencies are readily ascertainable from either preliminary measurement or can be found in the literature.

According to its broadest aspect, amplitude and phase of said wave beam interacted upon by said medium are detected and measured simultaneously. Although it is well known in the art that phase shift and amplitude changes are correlated, I have found that additional information may be gathered by measuring phase shift as well as amplitude changes simultaneously. In its broadest scope, my process therefore provides measuring information which has heretofore not been possible to achieve.

The invention is not limited to the embodiments described above, it being understood that all changes and modifications thereof not constituting departures from the spirit and scope of my invention are intended to be covered by the following claims.

What is claimed is:

1. An apparatus for examining the condition of a medium undergoing changes comprising an ultrahigh frequency oscillator, a measuring circuit fed by said oscillator and consisting of two branches connected in parallel, one of said branches comprising at least a measuring vessel containing the medium and the other one of said branches comprising an adjustable attenuator and an adjustable phase shifter, a modulator connected to the output of said measuring circuit and being modulated with a frequency lower than that of the ultrahigh frequency wave beam, a demodulator bridge circuit having two inputs and being connected with one of its inputs to the output of the modulator and with the other one of its inputs via an attenuator to the oscillator, and further having two branches, one of said branches containing a rectifying and detecting unit and the other one of said branches containing a 90° phase shifting unit and a second rectifying and detecting unit connected in series, a cathode ray oscilloscope the vertical and the horizontal input of which being connected to the first and to the second rectifying and detecting unit, respectively, and an intensity control unit controlled by the frequency of the modulator and being connected to the intensity modulation input of the oscilloscope.

2. An apparatus according to claim 1 comprising a variable sweep oscillator.

3. An apparatus for examining the condition of a medium undergoing changes comprising an ultrahigh frequency oscillator, a measuring circuit fed by said oscillator and consisting of two branches connected in parallel, one of said branches comprising at least a measuring vessel containing the medium and the other one of said branches comprising an adjustable attenuator and an adjustable phase shifter, a modulator connected to the output of said measuring circuit and being modulated with a frequency lower than that of the ultrahigh frequency wave beam, a demodulator bridge circuit having two inputs and being connected with one of its inputs to the output of the modulation and with the other one of its inputs via an attenuator to the oscillator, and further having two branches, one of said branches containing a rectifying and detecting unit and the other one of said branches containing a 90° phase shifting unit and a second rectifying and detecting unit connected in series, a cathode ray oscilloscope the vertical and the horizontal input of which being connected to the first and to the second rectifying and detecting unit, respectively, and an intensity control unit controlled by the frequency of the modulator and being connected to the intensity modulation input of the oscilloscope, the input and the output of the measuring circuit and the inputs of said demodulator bridge circuit being provided as magic Tees.

4. An apparatus as claimed in claim 3 comprising at least one uniline element preceding and at least one uniline element following the measuring vessel as well as the modulating unit, and an ultrahigh frequency oscillator for generating a sweep frequency.

* * * * *